United States Patent [19]

Moore et al.

[11] 4,294,112

[45] Oct. 13, 1981

[54] CLOSED TORQUE TEST MACHINE

[75] Inventors: Ronald D. Moore, Lexington Park; John W. Hall, Lusby, both of Md.

[73] Assignee: The United States of America as represented by the Secretary of the Navy, Washington, D.C.

[21] Appl. No.: 150,381

[22] Filed: May 16, 1980

[51] Int. Cl.³ .......................................... G01M 13/02
[52] U.S. Cl. .................................................. 73/162
[58] Field of Search ...................... 73/162, 847, 133 R

[56] References Cited

U.S. PATENT DOCUMENTS

| | | | |
|---|---|---|---|
| 3,078,711 | 2/1963 | Shutt | 73/162 |
| 3,112,643 | 12/1963 | Lanahan | 73/162 |
| 3,195,350 | 7/1965 | Reed | 73/162 |
| 3,690,168 | 9/1972 | Petersen | 73/162 |
| 3,796,092 | 3/1974 | Klinger | 73/162 |

Primary Examiner—Charles A. Ruehl

[57] ABSTRACT

Apparatus for testing mating splined parts under rotational torsional loading at selectively variable axial misalignments. The apparatus is in the form of what is commonly known as a four-square test machine to which a locked-in static torque is applied to simulate actual loading on splined connector parts during rotation.

14 Claims, 9 Drawing Figures

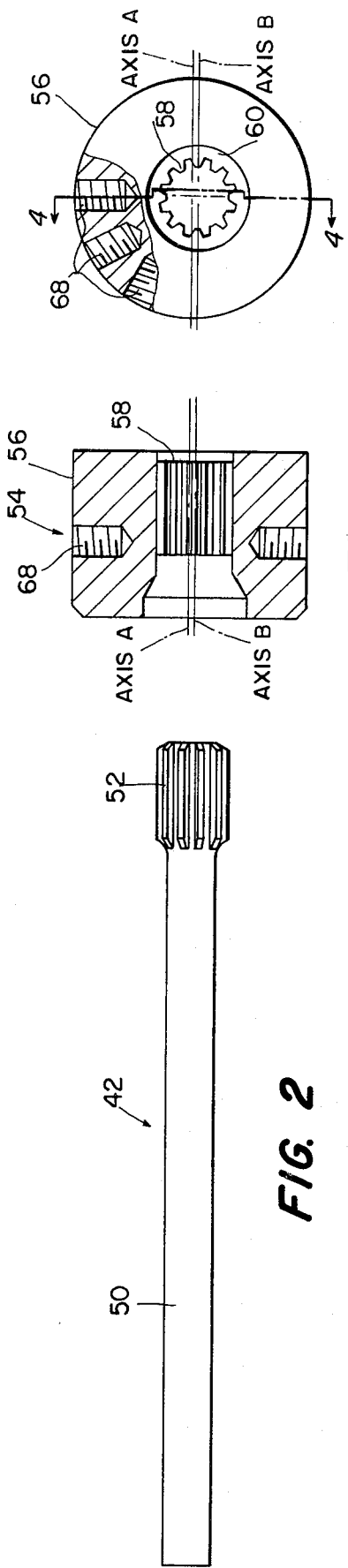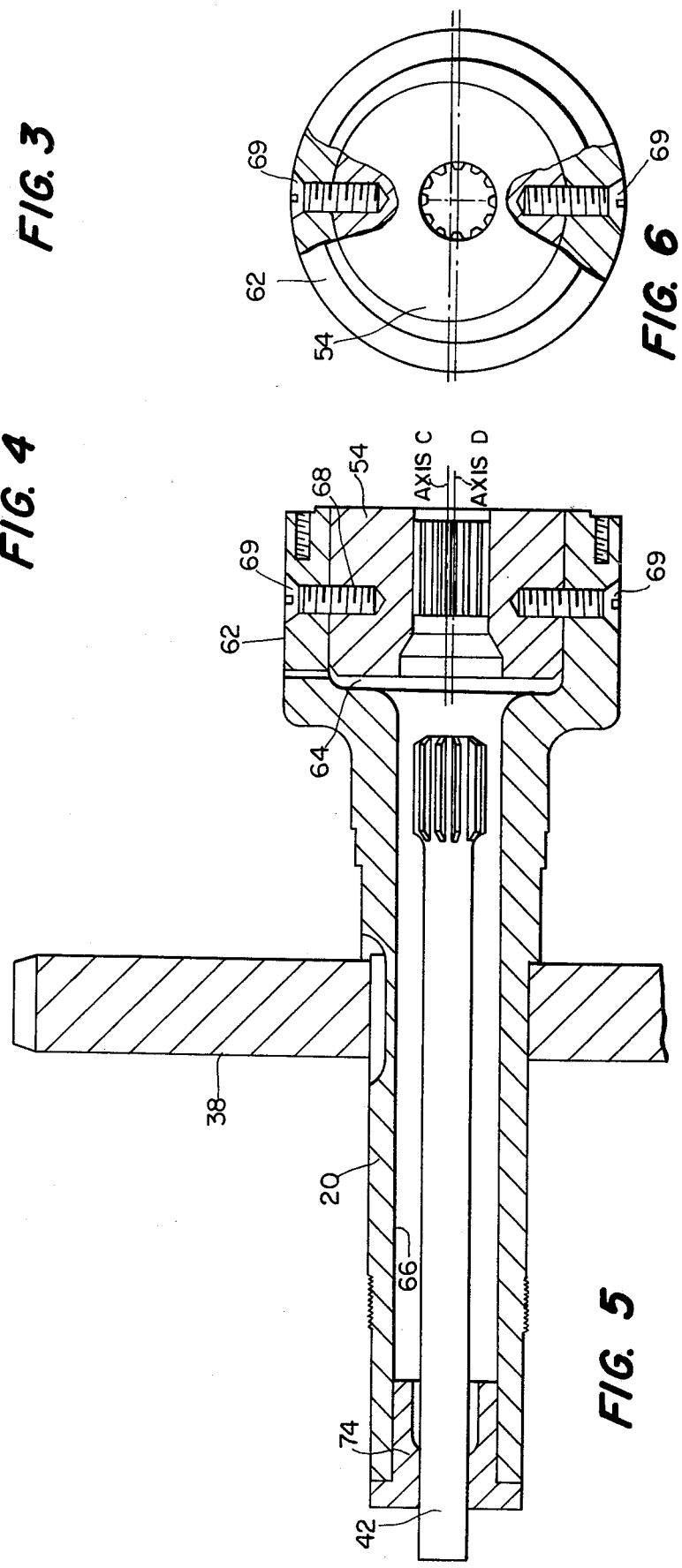

CLOSED TORQUE TEST MACHINE

BACKGROUND OF THE INVENTION

Accurate testing of splined parts under simulated conditions to determine such factors as wear and fatigue life is simplified by the use of four-square torque machines. Such machines are adapted to have dialed into them a predetermined torque for simulating load even though the machines and test specimens are at rest. Only minimal power is then required to rotate the specimen at designed speeds. This alleviates the need to actually transmit through the test specimen the total power to which it is designed and then have to absorb that power by means such as a pony brake on the output side.

Four-square test machines have long been known in the art for torque-testing power transmitting machine elements. This type of test machine normally involves a first pair of shafts rotatable connected to each other and interconnected with a second pair of like shafts in a manner permitting the locking-in of a torque to create artificial or simulated loads. The principle of this type of machine is disclosed in U.S. Pat. No. 3,078,711, wherein gears and shafts are formed in a loop to define a four-square into which static torque is applied. The contribution made by the disclosure of this patent is that the machine at rest is under no load, and torque is applied progressively as rotational speed increases to simulate actual drive conditions. U.S. Pat. No. 3,112,643 provides a four-square test machine having capability of providing torsional input to the loop while the machine is rotated. The idea of providing apparatus for varying the locked-in torque is disclosed in U.S. Pat. No. 3,195,350. It is capable of applying torque loading in either direction such as would be experienced in driving certain types of machinery. It is known, such as in U.S. Pat. No. 3,796,092, to apply lateral forces to test specimen under simulated actual working conditions.

SUMMARY OF THE INVENTION

The invention relates to improved apparatus for testing rotary power transmitting devices under both simulated torsional loads and induced shaft misalignments. In testing rotary power transmitting devices, such as splined couplings, it is always preferable to conduct tests under conditions reasonable approximating actual conditions. Splined couplings are called upon to transmit varying torsional loads in either direction and to do so under conditions of shaft misalignment, both angular and lateral.

The so called four-square closed-loop test machine, into which a static torque has been locked in, is particularly adapted to simulate torsional loads on test specimen. When so torqued, they induce an artificial load to simulate actual operating conditions, and require only a fraction of the power that would be required under actual working conditions. In testing splined connectors, it is necessary to recognize that axially coupled shafts are seldom if ever perfectly aligned. The present invention include structure for simulating such conditions.

OBJECTS OF THE INVENTION

It is therefore, an object of this invention to provide an improved four-square locked-in static torque machine for testing splined connector parts.

It is another object of this invention to provide a test machine having means providing misalignment of mating splined parts during testing.

It is another object of this invention to provide a test machine to test one or more sizes of splined connectors at the same time.

It is a still further object of this invention to provide a test machine capable of simulating a range of shaft misalignments.

Other objects, advantages and novel features of the invention will become apparent from the detailed description of the invention when considered in conjunction with the drawings.

BRIEF DESCRIPTION OF THE DRAWINGS

FIG. 2 is a side view of a test speciment, including an elongate shank terminating in a splined end forming, a part to be tested.

FIG. 3 is an end view of the index head including an eccentrically disposed splined recess also defining a part to be tested.

FIG. 4 is a cross-sectional view of an index head taken generally along line 4—4 of FIG. 3.

FIG. 5 is a cross-sectional view of one of the four tubular shafts illustrated in FIG. 1 showing an enlarged end having an eccentrically disposed recess receiving an index head, and illustrating a splined part ready for mating therewith.

FIG. 6 is an end view of the shaft and index head shown in FIG. 5.

DESCRIPTION OF THE PREFERRED EMBODIMENTS

Figure 1:
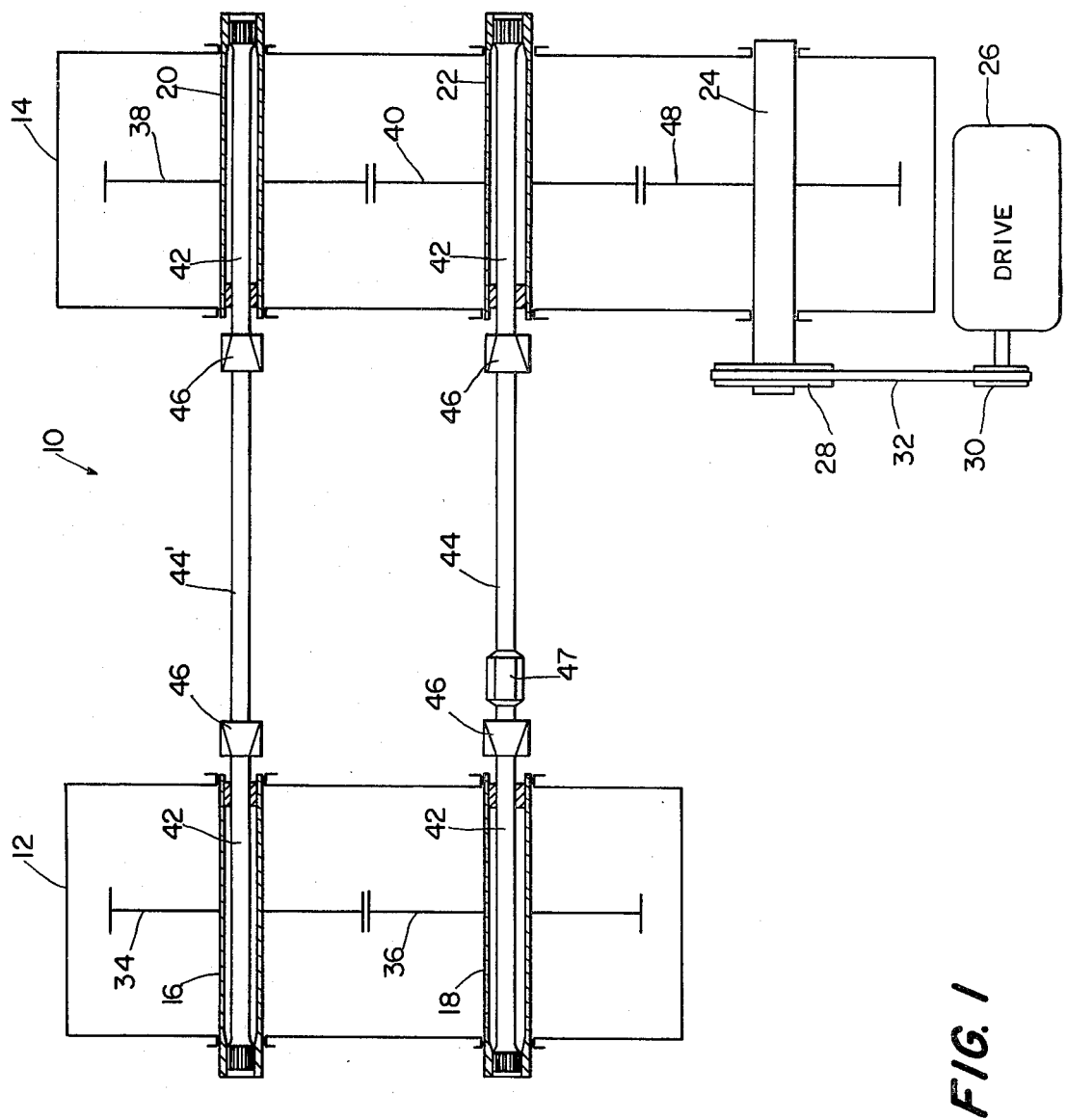
FIG. 1 is a schematic representation of a four-square test machine adapted to test splined connector parts.

Referring now to FIG. 1 of the drawings, there is shown in schematic representation a four-square closed-loop static torque test machine represented generally by the numeral 10. The machine includes a pair of spaced apart frames or housings 12 and 14, each rotatably mounting a pair of drivingly connected shafts. More specifically, housing 12 rotatably mounts a pair of parallel tubular shafts 16 and and 18, while housing 14 rotatably mounts a pair of parallel tubular shafts 20 and 22. Housing 14 further carries a drive shaft 24 rotated by motor 26 driving through pulleys 28, 30 and belt 32, or through other convenient power transmission apparatus, to drive the four-square test machine.

Tubular shafts 16 and 18 are drivingly connected for corotation by meshed gears 34 and 36, respectively, or by other known means such as a chain. Tubular shafts 20 and 22 are drivingly connected by meshed gears 38 and 40, respectively, or by similar alternative means. The tubular shafts are provided with internally facing splines at their outward ends. These splines are included in an index heads (not illustrated in FIG. 1). Elongate rods 42 having splined end portions are adapted to be carried through the shafts with their splines in mating contact with the splines of the index heads. A pair of torque rods 44, 44' are provided with means, such as Morse taper connectors 46, at their opposite ends for detachable connection with ends of elongate rod 42. The torque rods, in cooperation with rods 42, drivingly interconnect shaft 18 with shaft 22 and shaft 16 with shaft 20, respectively, to establish a closed loop of interconnected gears and shafts to define what is known as a four-square test machine. Motor 26 drives shaft 24 which in turn, through gear 48, drives meshed gears 40 and 38. Shafts 20 drives rod 42 through its splined connection to drive torque rod 44', which in turn drives another rod 42 in tubular shaft 16. Rotation of shaft 16 drives gear 34 which in turn drives gear 36 meshed therewith. Tubular shaft 18 rotates with gear 36 to drive another rod 42 disposed in shaft 18, which in turn drives torque rod 44 connected back through still another rod 42 in tubular shaft 22.

This completes the circuit and define the four-square arrangement. As so far disclosed, the gears and shafts are at rest. Drive 26 needs to overcome only frictional drag of the gears and shaft mountings to cause their rotation. The internally splined connector parts at the ends of the tubular shafts transmit only minimal torque during rotation of the four-square arrangement. Torque rods 44, 44' are of a diameter selected to twist upon the application of a torque applied thereto through nut 47. To establish a locked-in torque to the loop, connector 46 adjacent nut 48, is broken and at least one gear, such as gear 40, for example, temporarily locked to restrain rotation. A torsional force is applied to nut 47 to twist rod 44 for storing torsional energy therein. If gear 34, instead of gear 40, is temporarily locked against rotation, torsional energy may also be stored in torque rod 44'. When the connection is reestablished, and the gear or gears unlocked from restraint, there is established a locked-in static torsional load, which is carried through each splined connector part at the end of each tubular shaft. Though high torque is now transmitted through the splined parts of each connection, no more power than before is required to rotate the gears and shafts of the test machine. Connectors 46 have been disclosed as Morse taper connections because they are capable of transmitting high torsional loads, and are readily disconnectable. They form no part of the invention other than as a means of establishing a connection between the ends of the torque rods 44, 44' and the ends of the rods 42. Other types of connections may be used. Nut 47 is adapted to receive a torque tool by which a known torque is applied to and locked into the loop.

So far, only general reference has been made to the four tubular shaft, their respective index heads, and the test rods received through the shaft for engagement with the index heads. These elements and their cooperation with one another form an important feature of this invention and will now be described in more detail. The machine shown in FIG. 1 is adapted to test up to four splined connections of one or more sizes at the same time. There is shown in FIG. 2 an elongate rod 42 having a shank portion 50 terminating at one extremity in an externally splined end portion 52. It is the splines of this portion which are to be tested as a splined part. Though splined portion 52 is the part to be tested, the whole rod 42 including shank 50 may be referred to as a test specimen.

In FIG. 4 there is shown in cross-section an index head 54 having a cylindrical outer surface 56 concentric about axis A. A hole 58 having internal splines is provided through the index head concentric about axis B, offset from axis A to about 0.030". In other words, splined hole 58 is eccentrically positioned in head 54. FIG. 3 is an end view of the index head looking in form the right end of FIG. 4. The eccentricity of splined hole 58 with respect to cylindrical surface 56 is also noted in this figure. Internally splined hole 58 in index head 54 is of a size to receive externally splined end portion or part 52 in mating engagement. Head 54 and rod 42 define test specimens to be tested with each other. A tapered entrance 60 is provided at the entrance to splined hole 58 to guide splined end 52 into engagement. Index head 54 is provided with plurality of radial taps 68 at about 30° intervals around its entire periphery for position indexing to be discussed in detail in reference to FIGS. 5 and 6.

In FIG. 5 there is shown in more detail a typical tubular shaft, such as shaft 20, for example, from FIG. 1, and associated elements. Shaft 20 carries spur gear 38 which is keyed thereto. The right hand extremity or outer end 62 of shaft 20 is enlarged and includes a bellmouth recess 64 in communication with cylindrical bore 66. Recess 64 is cylindrical about an axis C offset by about 0.030" from axis D of cylinder 20 and outer cylindrical surface of end 62. Recess 64 has a diameter slightly larger than the diameter of index head 54 so that the head may be removable received therein. As shown in FIG. 5, plural set screws 69 are inserted through openings in the walls of end 62 and into selected taps 68 for holding the index head in fixed or indexed position. Taps 68 extend around the entire periphery of index head 54 and allow for rotary adjustment of the head in recess 64 for selective indexing at selected intervals. Index head 54 may be secured in recess 64 in several selected positions whereby the eccentricity of splined hole 58 with respect to axis D of shaft 20 may be varied from zero up to a maximum of 0.060".

A sleeve insert 74 in the left end of opening 66 of shaft 20 is selected of a size to coaxially mount shank 50 of rod 42. The internal diameter of sleeve 74 depends upon the diameter of shank 50, which in turn may vary with the size of splined part 52. If splined portion 52 is smaller than shank 50, the test specimens may be guided through inserted 74 into position in splined part 58 in index head 54. If splined part 52 is larger than shank 50, it will be necessary to assembly the test specimen from the bellmouth end of shaft 20. Index head 54 is then inserted into cavity 64 and the splined parts engaged.

Figure 7:
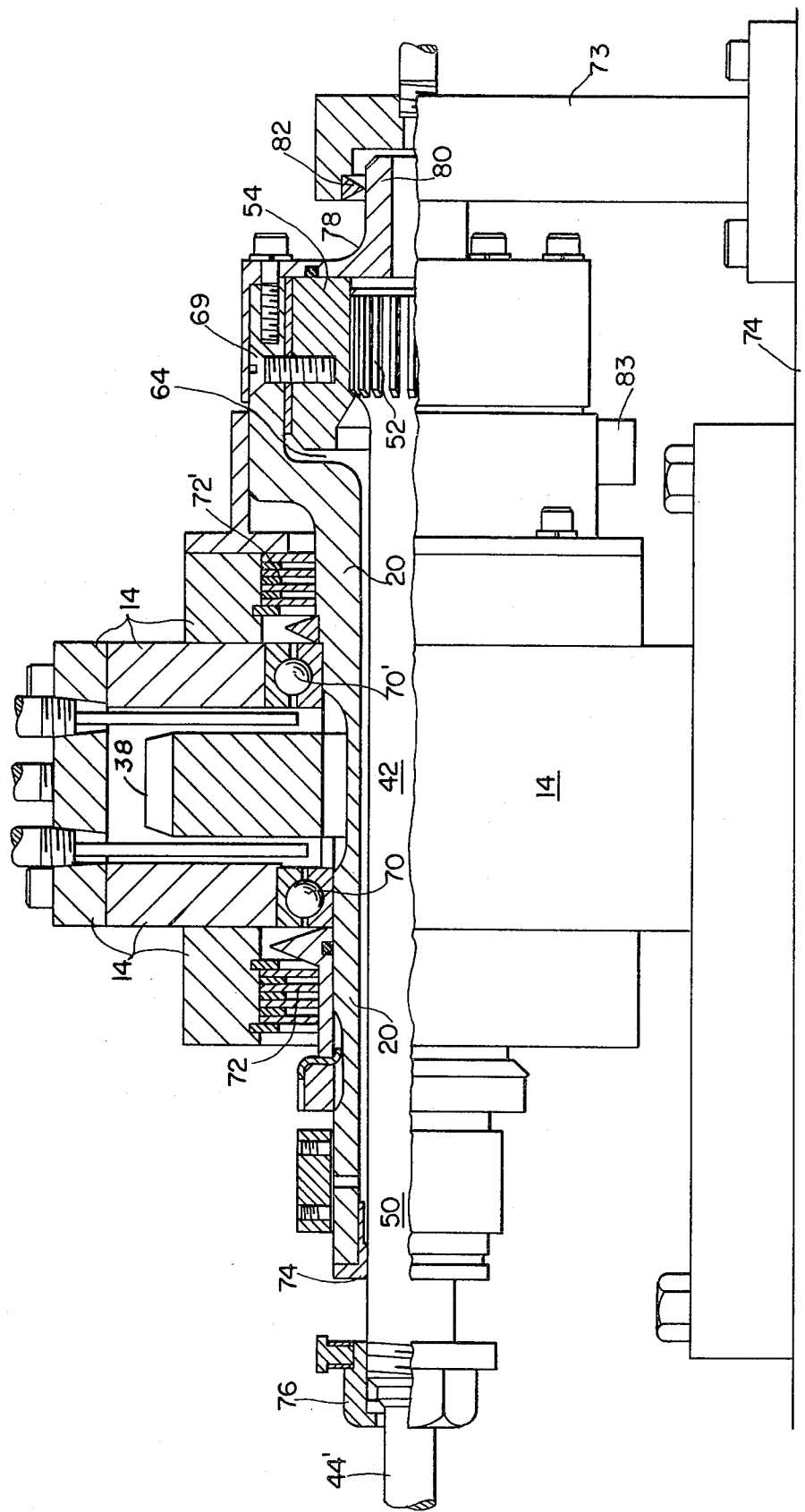
FIG. 7 is a partial cross-sectional view of one gear and shaft assembly illustrating its mounting on a frame.

Referring now to FIG. 7, an assembly of one of the shafts and associated machine elements is shown in partial cross-section. Shaft 20 is again arbitrarily selected from FIG. 1 for detail description. A portion of housing 14 surrounds gear 38 and mounts a pair of spaced apart bearing 70, 70' are rotatable carrying shaft 20. Housing 14, including space apart support 73, is mounted on base 74 for rigid co-planar support with housing 12. Oil seals 72 and 72' are provided outboard of the bearings in contact with shaft 20 for preventing oil leakage. At the left hand extremity of shaft 20, insert 74 is shown receiving shank 50 co-axially therewith. The inner end of shank 50 is shown connected end-to-end with torque rod 44' by threaded connection 76. Again, any type of connection, such as Morse tape connection 46, briefly described with reference to FIG. 1, may be employed for rotary power transmission.

Index head 54 is shown positioned inside bellmouth cavity 64 of shaft 20, and is retained in selected index therein by set screws 69. Splined end 52 is shown mated with internally splined hole 58 of index head 54. Each defines a part to be tested against the other under torsional loading and selected misalignment. A cover plate 78 is shown sealingly covering cavity 64 to prevent test specimen oil leakage. The cover includes a shank portion 80 surrounded by lip seal 82. Test specimen oil may be collected from drain 83.

Shaft 20 carries elongate rod 42 in co-rotation. While there is no relative rotation between shaft 20 and rod 42, there is gyratory movement of splined end 52 about the axis of shaft 20, the extent of which depends upon the eccentricity of splined hole 58. As previously mentioned, this eccentricity can be selectively adjusted from zero to a maximum of 0.060", depending upon the indexing of head 54. This permits the splined parts to be tested under near perfect axial alignment to misalignment up to 0.060". This misalignment is necessary to fairly test the splined parts under conditions similar to those in which a splined connection would be expected to perform in actual service. The term axial misalignment as used in this specification includes both lateral and angular displacement of axes.

The test machine is designed to test up to four pairs of mating splined parts at the same time. The machine is capable of testing splined parts over a range of sizes. Each size of externally splined portion 52 is paired with a complementary of mating internally splined opening 58 in index head 54. To test a different size splined portion 52 requires a different head 54, and vice versa.

Figure 8:
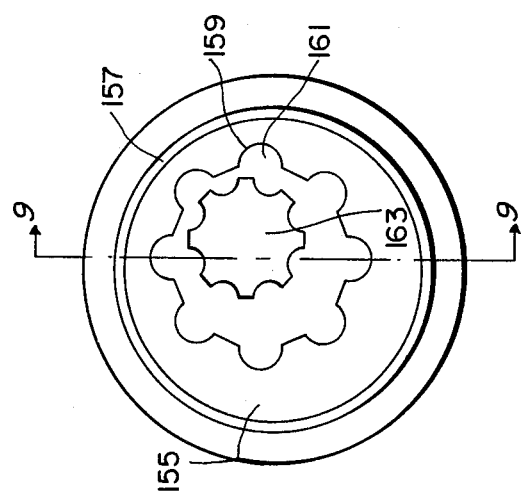
FIG. 8 is an end view of an alternate index head.
Figure 9:
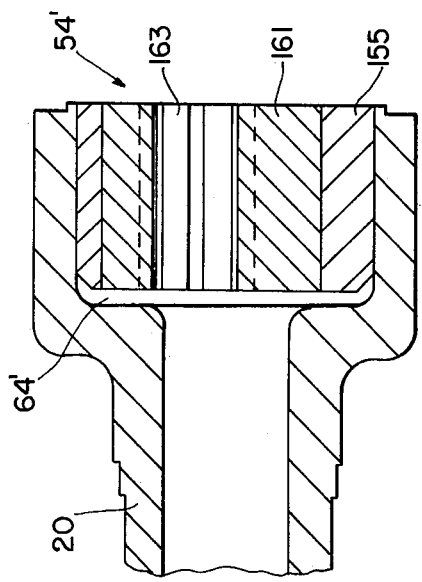
FIG. 9 is a cross-sectional view of the alternate index head taken along line 9—9 of FIG. 8.

In FIGS. 8 and 9 there is shown a slightly different embodiment of the index head. In this embodiment, all eccentricity is carried in index head 54', and it is adapted to be received in bellmouth opening 64', which in this embodiment is concentric with the axis of shaft 20. Index head 54' includes a main portion 155 having a cylindrical outer surface 157 adapted to be removable received in concentric cavity 64'. A splined opening 159 is eccentrically disposed in main portion 155 and is capable of selectively receiving insert 161. This insert, in turn, is provided with its own eccentrically located splined opening 163. The axis of splined opening 159 is offset from the axis of index head 54' by about 0.030" the axis of splined opening 163 is offset from the axis of insert 161 by about 0.030". When insert 161 is positioned within main portion 155 as shown in FIG. 8, eccentricities are added, and splined opening 163 has an eccentricity of about 0.060" with respect to the axis of shaft 20. On the other hand, if insert 161 is removed and repositioned by 180°, the axis of splined opening 163 is concentric with the axis of shaft 20. Insert 161 may be selectively repositioned, as shown in FIG. 8, by 45° increments inside main portion 155 for intermediate eccentric settings between zero and the maximum. Head 54' is adapted to be fixedly secured in indexed position within cavity 64' by set screws (not shown) similar to the disclosure in FIG. 5. Obviously, smaller and more numerous splines between portion 155 and insert 161 would permit finer adjustments. The entrance to splined opening 163 may be tapered, similar to the FIG. 4 embodiment, to aid in its mating assembly with an externally splined portion 52.

While tubular shafts 16 and 18 in housing 12, and shaft 20 and 22 in housing 14, are shown connected by gears for co-rotation, it will be obvious that other means, such as chain drives, may be employed to transmit rotary motion from one shaft to another.

After paired mating splined parts have been operated (tested) under simulated actual conditions of torque loading and imposed misalignment for a predetermined period of time, they are removed for inspection by apparatus and process according to another invention.

Disclosure has been made to test apparatus capable of testing splined parts. It will be understood that details of construction and changes may be made to the disclosure without departing from the principle of the invention as set forth in the claims. The invention is not limited other than by the scope of the appended claims.

What is claimed is:

1. Apparatus for testing mating splined parts under rotational torque load and axial misalignments comprising:
   a first pair of rotatably connected shafts;
   a second pair of rotatably connected shafts;
   means generally coextensive with and interconnecting the shaft pairs to define a four-square arrangement;
   means for inducing a locked-in static torque in the arrangement;
   at least one of the shafts carrying one splined part to be tested;
   said interconnecting means carrying another splined part to be tested in mating torque load engagement with the first mentioned splined part;
   means driving the arrangement and;
   means for selectively positioning the splined part carried by the shaft out of concentricity with respect to the axis of shaft rotation;
   whereby upon rotation of the arrangement the mating splined parts are torque tested under load and selected axial misalignment.

2. The invention according to claim 1 wherein said shafts pairs are parallel.

3. The invention according to claim 1 or 2 wherein the interconnecting means includes elongate torsion bars generally axially disposed from the shafts.

4. The invention according to claim 1 or 2 wherein said at least one shaft is tubular and carries an inwardly facing splined part and the interconnecting means carried on outwardly facing splined part.

5. The invention according to claim 4 wherein the inwardly facing splined part is located adjacent one end of the tubular shaft and the outwardly facing splined part is carried at one end of an elongate shank disposed generally coextensive within the tubular shaft.

6. The invention according to claim 4 wherein the inwardly facing splined part is selectively positionable within the tubular shaft for offsetting its axis with respect to the axis of shaft rotation thereby establishing axial misalignment between said mating splined parts.

7. The invention according to claim 5 wherein the inwardly facing splined part is carried on an index head selectively positionable within the tubular shaft for eccentrically positioning the splined part with respect to the axis of shaft rotation.

8. The invention according to claim 1 or 2 wherein the other end of the tubular shaft receives the elongate shank coaxially therewith.

9. The invention according to claim 8 wherein the splined part at one end of the shank gyrates during rotation.

10. The invention according to claim 4 wherein all the shafts are tubular and carry splined parts adjacent one end.

11. The invention according to claim 1 or 2 wherein all shafts carry splined parts.

12. The invention according to claim 11 wherein the interconnecting means carry splined parts in mating engagement with the shaft-carried splined parts.

13. Apparatus for testing mating splined parts under rotational torque load including axial misalignment conditions comprising:

a first pair of parallel tubular shafts rotatably connected;
a second pair of parallel tubular shafts rotatably connected;
torque rod means interconnecting the first and second pairs of tubular shafts to define a four-square test arrangement;
means for inducing a locked-in static torque in the arrangement;
head means carried in one end of at least one shaft and including a splined part to be tested;
means for selectively indexing the head to position the splined part in eccentricity with the axis of shaft rotation;
another splined part carried at the end of at least one torque rod and in mating torque load engagement with the first mentioned splined part; and,
means for rotating the arrangement whereby the mating splined parts are torque tested under load and selected axial misalignments.

14. The invention according to claim 13 wherein said another splined part is carried at the end of an elongate shank portion mounted axially within the shaft.

* * * * *